(12) United States Patent
Greenwood et al.

(10) Patent No.: US 11,341,566 B2
(45) Date of Patent: May 24, 2022

(54) SYSTEMS AND METHODS FOR PROVIDING A 3-D SHOPPING EXPERIENCE TO ONLINE SHOPPING ENVIRONMENTS

(71) Applicant: Kimberly-Clark Worldwide, Inc., Neenah, WI (US)

(72) Inventors: Kim Marie Greenwood, Appleton, WI (US); Jonathan Roy Mahnke, Appleton, WI (US); Shawn Jeffery Sullivan, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 378 days.

(21) Appl. No.: 15/516,593

(22) PCT Filed: Oct. 13, 2014

(86) PCT No.: PCT/US2014/060269
§ 371 (c)(1),
(2) Date: Apr. 3, 2017

(87) PCT Pub. No.: WO2016/060637
PCT Pub. Date: Apr. 21, 2016

(65) Prior Publication Data
US 2017/0249693 A1    Aug. 31, 2017

(51) Int. Cl.
*G06Q 30/06*     (2012.01)
*G06T 15/00*    (2011.01)
*G06T 19/00*    (2011.01)

(52) U.S. Cl.
CPC ..... *G06Q 30/0643* (2013.01); *G06Q 30/0601* (2013.01); *G06T 15/00* (2013.01); *G06T 19/003* (2013.01)

(58) Field of Classification Search
CPC ... G06T 19/003; G06T 15/00; G06Q 30/0643; G06Q 30/0601
(Continued)

(56) References Cited

U.S. PATENT DOCUMENTS

2008/0043013 A1* 2/2008 Gruttadauria .......... G06Q 30/02
                                                                345/419
2008/0195503 A1* 8/2008 Habeishi ............ G06Q 30/0601
                                                                705/26.1
(Continued)

FOREIGN PATENT DOCUMENTS

CN         103714464 A      4/2014
JP        2003030469 A      1/2003
(Continued)

OTHER PUBLICATIONS

Virtual worlds: Immersive Online Platforms for Collaboration, Creativity and Learning. 2011. OECD Digital Economy Papers (Jun. 17): 0_1-49, https://dialog.proquest.com/professional/docview/874045972?accountid=131444 (Year: 2011).*

(Continued)

*Primary Examiner* — Matthew E Zimmerman
*Assistant Examiner* — Latasha D Ramphal
(74) *Attorney, Agent, or Firm* — Armstrong Teasdale LLP

(57) ABSTRACT

A computer-implemented method for providing a 3-D shopping experience to an online shopping environment is implemented by a 3-D shopping rendering computer system. The method includes storing, within the memory, a plurality of 3-D product images, wherein each of the plurality of 3-D product images is associated with a product identifier, grouping the plurality of product identifiers into a plurality of shopping groupings, receiving a product request, wherein the product request includes a first product identifier included within the plurality of product identifiers from an online shopping computer system, generating a virtual shopping layout based upon a first shopping grouping included within the plurality of shopping groupings at the 3-D shopping rendering computer system, rendering a virtual shopping experience based on the virtual shopping layout, wherein the virtual shopping experience represents a navi- (Continued)

gable online shopping experience, and providing the virtual shopping experience to the online shopping computer system.

19 Claims, 11 Drawing Sheets

(58) Field of Classification Search
USPC .......................................................... 705/27
See application file for complete search history.

(56) References Cited

U.S. PATENT DOCUMENTS

| | | |
|---|---|---|
| 2009/0012846 A1 | 1/2009 | Ertell et al. |
| 2009/0287728 A1* | 11/2009 | Martine ................. G06Q 30/02 |
| 2012/0223943 A1 | 9/2012 | Williams et al. |
| 2013/0066750 A1* | 3/2013 | Siddique ............ G06Q 30/0601 |
| | | 705/27.2 |
| 2014/0365333 A1* | 12/2014 | Hurewitz ........... G06Q 30/0643 |
| | | 705/26.9 |

FOREIGN PATENT DOCUMENTS

| | | | |
|---|---|---|---|
| JP | 2012048710 A | 3/2012 | |
| WO | WO-0072179 A2 * | 11/2000 | ............. G06Q 30/06 |

OTHER PUBLICATIONS

International Search Report and Written Opinion for PCT/US2014/060269, dated Jun. 30, 2015, 11 pages.

* cited by examiner

SYSTEMS AND METHODS FOR PROVIDING A 3-D SHOPPING EXPERIENCE TO ONLINE SHOPPING ENVIRONMENTS

BACKGROUND

This invention relates to virtual shopping and more specifically to systems and methods for creating a 3-D shopping experience using a plug-in, API, or any other suitable method.

In many online shopping environments (e.g., electronic commerce sites or electronic commerce applications), customers (or online users) may search for a specific product they are interested in by searching or browsing for such a product. Further, customers may search or browse across online shopping environments (and across multiple electronic commerce sites and/or multiple electronic commerce applications). Search or browsing results contain products that match the search criteria (or browsing behavior) and the customer may select, view and purchase each of such products.

In contrast, the shopping experience of a brick-and-mortar retailer store ("physical store") varies from that of such an online shopping environment. When shopping within a physical store, a customer navigates to specific departments, and then walks down an aisle and discovers the products they are searching for. Customers may compare different products and make immediate decisions based on information provided on the package itself as well as information from the store such as pricing. While browsing the physical store, customers also buy products that they "discover" in an aisle. As a result, in such physical stores, customers may often make different purchasing decisions than they may make in an online shopping environment.

A system that includes the convenience of online shopping with the customer experience of shopping within a physical store is desired.

BRIEF DESCRIPTION OF THE DISCLOSURE

In one aspect, a computer-implemented method for providing a 3-D shopping experience to an online shopping environment is provided. The method is implemented using a 3-D shopping rendering computer system in communication with a memory. The method includes storing, within the memory, a plurality of 3-D product images, wherein each of the plurality of 3-D product images is associated with a product identifier, grouping the plurality of product identifiers into a plurality of shopping groupings, receiving a product request, wherein the product request includes a first product identifier included within the plurality of product identifiers from an online shopping computer system, generating a virtual shopping layout based upon a first shopping grouping included within the plurality of shopping groupings by the 3-D shopping rendering computer device, wherein the first shopping grouping includes the first product identifier, wherein the virtual shopping layout represents a virtual spatial relationship between each of the product identifiers included within the first shopping grouping, rendering a virtual shopping experience based on the virtual shopping layout, wherein the virtual shopping experience represents a navigable online shopping experience, and providing the virtual shopping experience to the online shopping computer system.

In another aspect, a 3-D shopping rendering computer system for providing a 3-D shopping experience to an online shopping environment is provided. The 3-D shopping rendering computer includes a memory for storing data and a processor in communication with the memory. The processor is configured to store a plurality of 3-D product images, wherein each of the plurality of 3-D product images is associated with a product identifier, group the plurality of product identifiers into a plurality of shopping groupings, receive, from an online shopping computer system, a product request, wherein the product request includes a first product identifier included within the plurality of product identifiers, generate a virtual shopping layout based upon a first shopping grouping included within the plurality of shopping groupings, wherein the first shopping grouping includes the first product identifier, wherein the virtual shopping layout represents a virtual spatial relationship between each of the product identifiers included within the first shopping grouping, render a virtual shopping experience based on the virtual shopping layout, wherein the virtual shopping experience represents a navigable online shopping experience, and provide the virtual shopping experience to the online shopping computer system.

In another aspect, a computer-readable storage device having processor-executable instructions embodied thereon, for providing a 3-D shopping experience to an online shopping environment is provided. When executed by a computing device, the processor-executable instructions cause the computing device to store a plurality of 3-D product images, wherein each of the plurality of 3-D product images is associated with a product identifier, group the plurality of product identifiers into a plurality of shopping groupings, receive, from an online shopping computer system, a product request, wherein the product request includes a first product identifier included within the plurality of product identifiers, generate a virtual shopping layout based upon a first shopping grouping included within the plurality of shopping groupings, wherein the first shopping grouping includes the first product identifier, wherein the virtual shopping layout represents a virtual spatial relationship between each of the product identifiers included within the first shopping grouping, render a virtual shopping experience based on the virtual shopping layout, wherein the virtual shopping experience represents a navigable online shopping experience, and provide the virtual shopping experience to the online shopping computer system.

The features, functions, and advantages described herein may be achieved independently in various embodiments of the present disclosure or may be combined in yet other embodiments, further details of which may be seen with reference to the following description and drawings.

Figure 1:
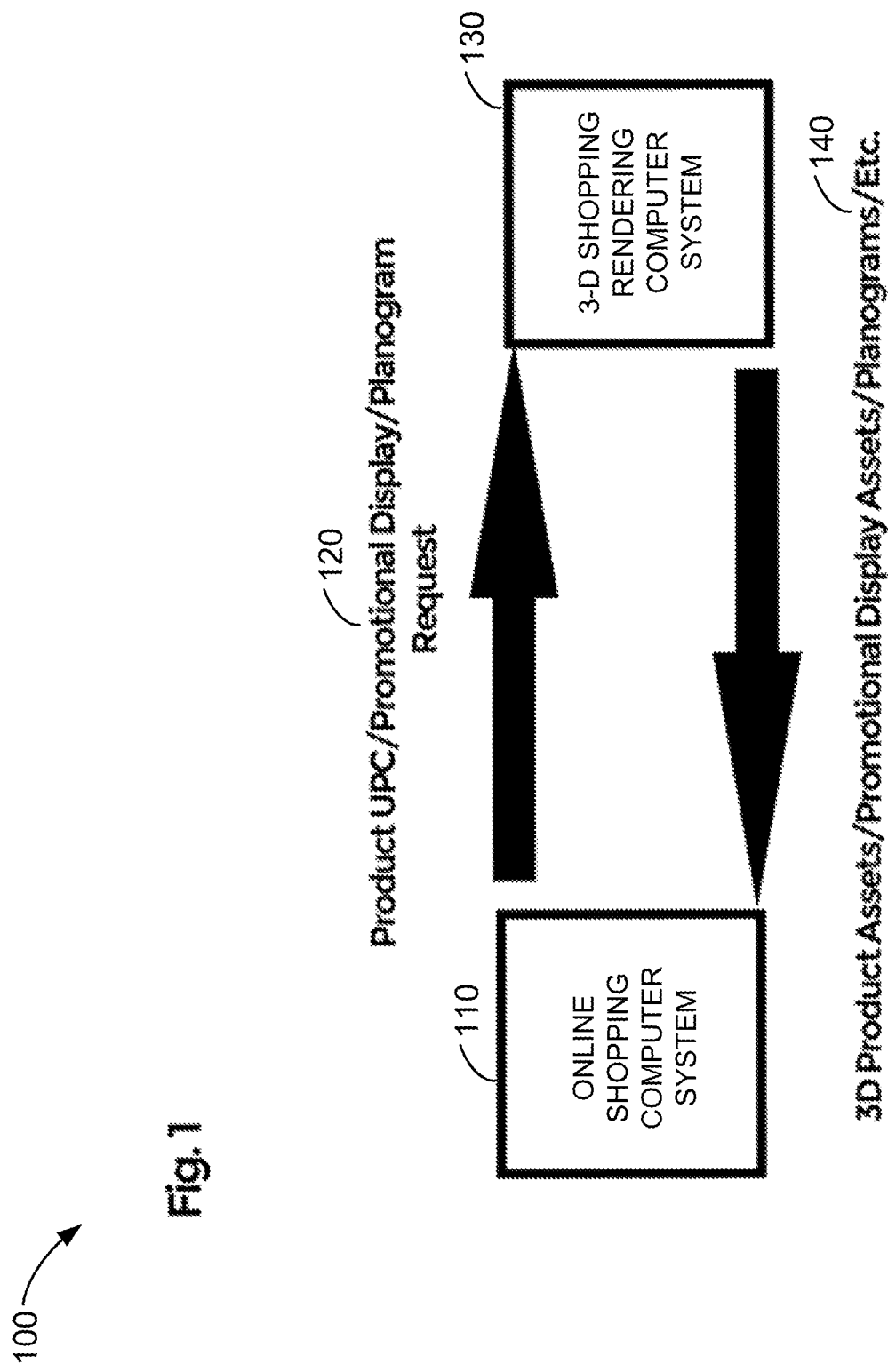
FIG. 1 is a simplified flow chart illustrating providing a 3-D shopping experience to an online shopping computer system implemented by a 3-D shopping rendering computer system.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

The following detailed description of implementations refers to the accompanying drawings. The same reference numbers in different drawings may identify the same or similar elements. Also, the following detailed description does not limit the claims.

The system and methods described herein provides elements of shopping experiences in both online shopping environments and physical stores to a variety of online shopping environments. The system and methods described herein may be integrated with existing online shopping environments. Specifically, the system and methods described herein receives information related to an online shopping environment and online users, and serves a three-dimensional ("3-D") shopping experience to the online users.

The subject matter described herein relates generally to creating a 3-D shopping experience (or a 3-D virtual store) that may be provided to a user of an online shopping environment that is provided by an online shopping computer system. In the example embodiment, a 3-D shopping rendering computer system provides the 3-D shopping experience to the online shopping computer system. In an example embodiment, the online shopping computer system uses plug-in software embedded within the software of the online shopping environment to access the 3-D shopping experience from the 3-D shopping rendering computer system via an application programming interface ("API"). Alternately, the API may be called directly by other software, hardware, or combination of software and hardware. The 3-D shopping rendering computer system is designed to enhance the current online shopping environment, and may use data associated with the online shopping computer system (and the physical stores associated with the online shopping computer system) as well as data associated with online users to generate the 3-D shopping experience. Alternately, any other suitable method may be used.

The methods and systems described herein may be implemented using computer programming or engineering techniques including computer software, firmware, hardware or any combination or subset thereof, wherein the technical effects may be achieved by performing one of the following steps: (a) storing, at the virtual shopping rendering computer system, a plurality of three-dimensional product images, wherein each of the plurality of three-dimensional product images is associated with a product identifier; (b) grouping the plurality of product identifiers into a plurality of shopping groupings; (c) receiving, from an online shopping computer system, a product request, wherein the product request includes a first product identifier included within the plurality of product identifiers; (d) generating a virtual shopping layout based upon a first shopping grouping included within the plurality of shopping groupings, wherein the first shopping grouping includes the first product identifier, wherein the virtual shopping layout represents a virtual spatial relationship between each of the product identifiers included within the first shopping grouping; (e) rendering a virtual shopping experience based on the virtual shopping layout, wherein the virtual shopping experience represents a navigable online shopping experience; and (f) providing the virtual shopping experience to the online shopping computer system.

Technical effects of the methods and systems described herein may include: (a) improved speed of generating and serving online virtual shopping environments via a plug-in, API, or any other suitable method that accesses the 3-D shopping rendering computer system, (b) representation of actual and altered physical stores in a 3-D shopping experience, (c) improved user experience of online users in online shopping experiences, (d) improved analytical data of customer behavior in physical stores by monitoring customer behavior in virtual environments representing physical stores; and (e) improved ability for online users to browse and navigate online shopping environments.

In the example embodiment, an online user (or customer) may navigate to an online shopping computer system using a web browser, an online application, or any other suitable method. Further, the online user may access the online shopping computer system using any suitable user computing device including, for example, desktop, tablet, mobile, entertainment/game, and wearable devices. The online user may search for a product or browse to a product using any suitable method. As a result, the online shopping computer system may provide a textual or two-dimensional rendering of the product that was searched for or browsed for. As described herein, the online shopping computer system includes software that is configured to access the 3-D shopping rendering computer system using a plug-in, an API, or any other suitable method.

As described herein, the 3-D shopping rendering computer system includes (or stores) a plurality of 3-D product images associated with a plurality of product identifiers. The 3-D shopping rendering computer system may include a plurality of information related to the 3-D product images. In several embodiments, the 3-D shopping rendering computer system includes information related to the physical size, volume, and other physical characteristics of the physical product corresponding to each product identifier (and 3-D product image). As described herein, such physical characteristic information may be used to generate a virtual shopping layout that corresponds to the physical dimensions of the physical products.

The product identifiers (and associated 3-D product images) may be further associated with a plurality of product groupings based on any suitable category including, for example, product type, product brand, product price range, and any other suitable category. In many examples, the product identifiers may also be grouped based on the groupings of the products within a particular region of a physical store. In at least one example, product identifiers are grouped based upon their groupings within aisles or sections of a physical store. In other words, product identifiers may all be associated with a particular aisle or section of a physical store. Alternately, product identifiers may be grouped based on a modified version of a physical store such as a merger of multiple aisles, a subset of an aisle, or a hybridized version of various sections of a physical store. Further, product identifiers may be grouped in manners that are not represented in any physical store. For example, based on customer search histories, customer purchase histories, and customer social network interactions, the product identifiers may be grouped in a manner specific to a customer. In one example, a virtual aisle may be created that is composed of items that a customer searches for (at one time or over several browsing sessions), shops for (at one time or over several shopping sessions), and/or items that social network contacts of a customer browse or shop for.

When the online user selects the searched for or browsed for product ("selected product"), the 3-D shopping rendering computer system may be accessed via the plug-in, an API, or any other suitable method. More specifically, the online shopping computer system (providing the retailer's e-commerce site or e-commerce application) transmits a product request representing a request related to the selected product. The product request may include any suitable information including a universal product code number ("UPC" number), a stock keeping unit number ("SKU" number), a planogram request, a promotional product request, and any other suitable identifier.

The online shopping computer system may also provide information that pertains to the online user (online user data) and/or the online shopping computer system (online retailer data). Online user data and online retailer data may be provided with the product request or asynchronously. Online user data may include any suitable information related to the online user including, for example, customer purchasing profiles, customer spending information, customer location information, customer search information, customer shopping and purchase information, customer social networking information, customer preferences, customer profiles, and other customer shopping information. Customer profiles may include collections of data describing the shopping preferences, shopping behaviors, shopping browsing patterns, and shopping purchase patterns of a customer. Customer profiles may also associate a first customer with other customers connected to the first customer based on an affinity group or a social network. Online retailer data may include any suitable information including, for example, physical store layout information for physical stores associated with the online retailer, promotional information (identifying products that the online retailer wishes to promote), and pricing and merchandising information.

In some embodiments, the 3-D shopping rendering computer system stores customer search information, customer shopping and purchase information, customer social networking information, customer preferences, customer profiles, and other customer shopping information without including sensitive personal information, also known as personally identifiable information ("PII"), in order to ensure the privacy of individuals associated with the stored data. PII may include any information capable of identifying an individual. For privacy and security reasons, PII may be withheld from customer profiles. In some examples where privacy and security, such as through encryption, can otherwise be ensured, or where individuals may consent, PII may be retained in the customer profiles. In such examples, PII may be needed to reports about groups of customers. In situations in which the systems discussed herein collect personal information about individuals including customers, manufacturers, and retailers, or may make use of such personal information, the individuals may be provided with an opportunity to control whether such information is collected or to control whether and/or how such information is used. In addition, certain data may be processed in one or more ways before it is stored or used, so that PII is removed. For example, an individual's identity may be processed so that no PII can be determined for the individual, or an individual's geographic location may be generalized where location data is obtained (such as to a city, ZIP code, or state level), so that a particular location of an individual cannot be determined. Thus, the individual may have control over how information is collected about the individual and used by systems including the 3-D shopping rendering computer system.

The 3-D shopping rendering computer system generates a virtual shopping layout based on the product request. More specifically, the 3-D shopping rendering computer system identifies at least one product grouping that is associated with the product identifier included within the product request. More specifically, the 3-D shopping rendering computer system may identify all product groupings that contain the product identifier (e.g., the UPC number). The 3-D shopping rendering computer system may further identify one particular product grouping based on online user data and/or online retailer data.

Generating the virtual shopping layout represents generating a physical layout for a 3-D virtual store or a region of a 3-D virtual store (such as an aisle.) Accordingly, generating the virtual shopping layout represents generating a virtual spatial relationship between each of the product identifiers included within the first shopping grouping. Further, the 3-D shopping rendering computer system may generate virtual shopping layouts for multiple regions of the 3-D virtual store.

The 3-D shopping rendering computer system renders a virtual shopping experience based on the virtual shopping layout. The virtual shopping experience represents a navigable online shopping experience. Accordingly, the 3-D shopping rendering computer system renders the virtual shopping experience to emulate physical interaction. In many examples, the 3-D shopping rendering computer system uses a suitable navigation engine such as a gaming engine.

In at least some examples, an online user and/or an online shopping computer system may not access an entire virtual shopping layout. Alternately, the online user may only access the individual selected product and view the selected product as a 3-D object that may be rotated and examined.

The 3-D shopping rendering computer system provides the virtual shopping experience to the online shopping computer system via the plug-in, an API, or any other suitable method. More specifically, the online shopping computer system and the 3-D shopping rendering computer system engage in a two-way data exchange whereby the online shopping computer system provides product, customer, and retailer information to the 3-D shopping rendering computer system and the 3-D shopping rendering computer system provides the online shopping computer system with updated shopping cart information. More specifically, the online shopping computer system may provide a product identifier (described below), a plurality product identifiers, online retailer data, and customer data to the 3-D shopping rendering computer system. Such provided information is used by the 3-D shopping rendering computer system to create a layout of a virtual shopping experience and render the virtual shopping experience for display within the plug-in or using the API or any other suitable method. Upon selection of products by the customer in the virtual shopping experience, the 3-D shopping rendering computer system may transmit product selection information back to the online shopping computer system to update an online shopping cart at the online shopping computer system. In some examples, the 3-D shopping rendering computer system may also transmit behavioral information, browsing information, and other virtual shopping information to the online shopping computer system, as described herein. Accordingly, the online shopping computer system provides the online user with the virtual shopping experience. In the example embodiment, the online shopping computer system appears to provide the virtual shopping experience directly without any indication that a separate service or software is invoked. The online user may navigate or otherwise use the 3-D shopping experience by using any suitable user computing device including, for example, desktop, tablet, mobile, entertainment/game, and wearable devices.

The online user may therefore use the virtual shopping experience in a manner similar to a physical store. For example, the online user may retrieve individual products (such as the selected product) and retrieve it from an online shelf or an online display. 3-D products can also be displayed as they would appear outside of their packaging, allowing the customer to know exactly what they are purchasing. The product may be rotated and examined by the online user and compared to other products. Further, the online user may "move" virtually within the virtual shopping experience and access other products.

As described herein, the 3-D shopping rendering computer system may further receive information related to the browsing behaviors of the online user. For example, the products that are purchases, retrieved (from a shelf or display for inspection) but not purchased, and viewed but not retrieved may all be stored by the 3-D shopping rendering computer system and used for analysis. Additional details related to the specific user behavior may also be received and monitored. For example, lengths of time viewing retrieved products may be received and stored for analysis. All such browsing behavior information may be stored and used subject to PII as described above.

The 3-D shopping experience provided by the 3-D shopping rendering computer system represents a virtualized store that may be similar to the visual and organizational layout of a physical store. In at least some examples, the 3-D shopping experience provided by the 3-D shopping rendering computer system uses a layout that is based directly upon at least one store layout associated with a physical store that is associated with the online shopping environment. For example, the online shopping computer system may be associated with a "brick-and-mortar" company that includes a variety of physical stores. In at least some examples, the 3-D shopping experience provided by the 3-D shopping rendering computer system is based on the layout of one of the associated physical stores.

In further examples, the online user may provide the online shopping computer system with location information that may associate the online user with a particular region. Accordingly, the layout of the 3-D shopping experience may correspond to the physical store of the "brick-and-mortar" company closest to the location information of the online user. Accordingly, the online user may receive a 3-D shopping experience that substantially represents the shopping experience that the online user would have at the nearest physical store of the "brick-and-mortar" company.

As described herein, the 3-D shopping rendering computer system is implemented with a "cloud-based" architecture and includes a database of products, a plurality of displays, and navigation resources. 3-D product images included within the 3-D shopping rendering computer system are modeled in 3-D and textured to represent realistic visual and photo-textural characteristics. Third party computer systems (e.g., product vendors and manufacturers) may access the associated databases to provide, update, and maintain 3-D product images and information associated with the 3-D product images (e.g., product identifiers and product physical characteristics). In the example embodiment, access to such databases (and other systems of the 3-D shopping rendering computer system) are limited to ensure that content producers only have access to their own content. The cloud-based architecture provides 3-D product images (and associated information) to all of the various online shopping computer systems accessing the 3-D shopping rendering computer system via the API, plug-in, and/or any other suitable method. In some examples, product producers may create an instance or update of a 3-D product and that may be displayed or made available to multiple online shopping computer systems simultaneously.

As described herein, the 3-D shopping rendering computer system substantially uses a cloud-based architecture. However, in alternative embodiments, any suitable architecture may be used. The 3-D shopping rendering computer system uses a rendering engine to capture information related to products and convert such information into 3-D product images. In the example embodiment, 3-D products are displayed in a realistic format wherein the dimensions indicated in the virtual shopping experience correlate to the dimensions in real life (or in a physical store.) As described, the product request may include any suitable product identifier including UPC codes, SKU codes, layout information for displaying a plurality of products in a promotional display or a planogram.

The virtual shopping experience provided by the 3-D shopping rendering computer system to the online shopping computer system substantially allows for navigation with and display to a plurality of user computing devices including desktop computers, mobile devices, touchscreen devices, entertainment devices, gaming devices, wearable computing devices (including Optical Head Mounted Displays or "OHMDs"), and 3-D virtualization devices. Similarly, the virtual shopping experience is designed to be served to any of a plurality of known online applications and online browsers because the plug-in and API technology allow for cross-platform functionality.

Described herein are computer systems such as the 3-D shopping rendering computer system and related computer systems. As described herein, all such computer systems include at least one processor and at least one memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, ORACLE® Database, MySQL, IBM® DB2, MICROSOFT® SQL Server, SYBASE®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a WINDOWS® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In further embodiments, the system may be run on any suitable computing and server environment, without limitation. The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the term "retailer" may refer to any seller of goods, services, or other products. A retailer may be an online retailer (i.e., a retailer associated with an electronic commerce site or an electronic commerce application), an offline retailer (i.e., a retailer with a physical store or physical stores), or a retailer that sells in both online and offline contexts (i.e., using an electronic commerce sites and physical stores). In some examples, retailers may alternately be referred to as "online retailer" indicating that the retailer may sell goods or services via an electronic commerce site or electronic commerce application. As used herein, online retailers may also sell products at physical stores. Retailers (or online retailers) may also be manufacturers, distributers, integrators, or re-packagers of goods or services.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified flow chart 100 illustrating providing a 3-D shopping experience to an online shopping computer system implemented by a 3-D shopping rendering computer system. As described above and herein, online shopping computer system 110 (i.e., the computer system associated with the online retailer) provides a product request 120 to 3-D shopping rendering computer system 130. More specifically, an online user (not shown in FIG. 1) accesses online shopping computer system 110 and navigates or searches for a specific product using any suitable user computing device. The online user selects the specific product which causes online shopping computer system 110 to access 3-D shopping rendering computer system 130 via the plug-in, API, or any other suitable method. More specifically, online shopping computer system 110 provides product request 120 (along with online user data and online retailer data) to 3-D shopping rendering computer system 130. Product request 120 may include a UPC code, a SKU code, a promotional display request (i.e., a request to show a particular promotional display associated with an individual product), and/or a planogram (i.e., a depiction of a plurality of products arranged on a display such as a shelf Or an aisle.) As described herein, virtual shopping experience 140 is generated and rendered by 3-D shopping rendering computer system 130 and provided to online shopping computer system 110.

In an example embodiment, the virtual shelves, virtual aisles, virtual stores, and the virtual shopping experience generated by 3-D shopping rendering computer system 130 may be accessed based on a product selection in online shopping computer system 110 (as represented in the product identifier contained in product request 120). However, in other examples, the virtual shelves, virtual aisles, virtual stores, and the virtual shopping experience may be generated and accessed based on other user inputs provided to online shopping computer system 110 including category selections, and pre-defined user lists.

In one example, a user may access online shopping computer system 110 and search or browse for a particular category of products (e.g., "diapers"). In this example, product request 120 may include a general selection for "diapers" and cause 3-D shopping rendering computer system 130 to generate virtual shopping experience 140 based on the category. Therefore, virtual shopping experience 140 may represent a virtual aisle, section, or store responsive to the searched or browsed for category of products (e.g., the virtual aisle may be only diapers and diaper-related products). In a second example, a user may access online shopping computer system 110 and search or browse for items that are on sale or otherwise associated with a promotion, rebate, or discount. In this example, product request 120 may include a general selection for "on sale" items and cause 3-D shopping rendering computer system 130 to generate virtual shopping experience 140 based on the category. Therefore, virtual shopping experience 140 may represent a virtual aisle, section, or store responsive to the searched or browsed for category of products (e.g., the virtual aisle may be only on-sale items). In a third example, a user may access online shopping computer system 110 and search or browse for items that are associated with a user list for the customer or a friend of the customer (e.g., a "wish list" for a friend of the customer). In this example, product request 120 may include a general selection for "wish list" items associated with the friend of the customer and cause 3-D shopping rendering computer system 130 to generate virtual shopping experience 140 based on the wish list. Therefore, virtual shopping experience 140 may represent a virtual aisle, section, or store responsive to the searched or browsed for category of products (e.g., the virtual aisle may be only wish list items).

In at least some examples, online shopping computer system 110 may be associated with a retailer or online retailer that sells a particular set of products that may be identified based on product identifiers. Accordingly, virtual shopping experience 140 may be rendered to only display products (including the product or products identified in product request 120) that may be sold by the retailer or online retailer. In at least one example, the online retailer may provide 3-D shopping rendering computer system 130 with a list of product identifiers ("product list") for all products that may be sold. The online retailer may provide 3-D shopping rendering computer system 130 with the product list using online shopping computer system 110 or any suitable computer system. In one example, the online retailer may provide 3-D shopping rendering computer system 130 with the product list represented as a file containing product identifiers, product price information, and other product attributes.

Accordingly, when 3-D shopping rendering computer system 130 renders virtual shopping experience 140 for a particular online retailer (associated with a particular online shopping computer system 110), 3-D shopping rendering computer system 130 may first retrieve the product list. 3-D shopping rendering computer system 130 may use the product list in generating virtual shopping experience 140. As a result, 3-D shopping rendering computer system 130 may generate virtual shopping experience 140 including only products that may be actually purchased at online shopping computer system 110 and avoid presenting products that will not successfully be added to online shopping carts of online shopping computer system 110. Further, 3-D shopping rendering computer system 130 may use product list to include information related to each product such as product pricing information, product promotional information, and other suitable information.

In some examples, the list of products sold by a retailer or online retailer may change over time. For example, certain products, product lines, or product categories may be removed from sale, altered, or added for sale. In such examples, the online retailer (via online shopping computer system 110 or any suitable computer system) may send a list of changes ("change list") reflecting products that are no longer sold by a retailer or online retailer. Accordingly, 3-D shopping rendering computer system 130 may use both the product list and change list to generating virtual shopping experience 140 and ensure that presented products include the products that the retailer or online retailer can sell.

In some examples, product list and/or change list may be provided in advance. In other examples, product list and/or change list may be provided with product request 120.

In additional examples, online shopping computer system 110 may be associated with a retailer or online retailer that has rules or policies for the display or promotion of its saleable items. For example, many retailers and online retailers have philosophies and aesthetic styles that dictate the experience that the retailer or online retailer wish to provide to customers. Such rules or policies may be documented and listed as product rules. For example, some retailers or online retailers may only use a certain number of shelves or a certain spacing of items. Other retailers or online retailers may use more or less empty space in a physical or virtual store. Additional retailers or online retailers may intentionally group particular products, brands, or product categories based on the philosophies of the retailer or online retailer. Accordingly, in at least one example, an online retailer or retailer (via online shopping computer system 110 or any other suitable computing device) may provide presentation rules to 3-D shopping rendering computer system 130 for use in rendering virtual shopping experience 140. Accordingly, virtual shopping experience 140 may be created to reflect the philosophies or styles of each online retailer.

Based on at least product lists, change lists, presentation rules, and online retailer data, online retailers (associated with online shopping computer system 110) may customize the virtual shopping experience 140 provided by 3-D shopping rendering computer system 130 in a manner similar to or distinct from physical stores associated with online shopping computer system 110. For example, products for a particular online retailer may be arranged on shelves using current planogram technology, physical store layouts, and physical or online store groupings. Alternately, online retailers may customize the virtual shopping experience 140 provided by 3-D shopping rendering computer system 130 specific to an online user (or customer) based on online user data (e.g., including search, browsing, and purchase history). Online retailers may also use non-product content (e.g., promotional displays and signage) to draw attention to specific products. Such non-product content may be designated and identified with rules for presentation in presentation rules. In some examples, online retailers may take advantage of the lack of physical constraints in virtual shopping experience 140 and accordingly customize virtual shopping experience 140 in a manner that ignores physical constraints. For example, products may be displayed floating in the air, on the floor, on a shelf, or elsewhere.

3-D shopping rendering computer system 130 may provide virtual shopping experience 140 including a variety of elements and display features that may be customized for a particular online retailer, online user, or combination thereof. In one example, online retailers may display virtual coupons within virtual shopping experience 140. Such virtual coupons may be displayed near or next to a promoted product (i.e., the product that is associated with the coupon), in an aisle containing the product, or in a display area outside the "shopping area" of a user display. Alternately, virtual coupons may be provided in an area away from the promoted product to incentivize the online user to navigate to the promoted product and discover other products on the way. Such virtual coupons may generally be beneficial in incentivizing purchases by online users.

3-D shopping rendering computer system 130 may design, layout, and render virtual shopping experience 140 using visual effects including color coding. For example, particular products may be color-coded based on price (e.g., low prices are in silver and higher prices are in gold), reviews quality (e.g., when social media review suggest a product is high quality, the product may be displayed in green), previous purchases, or available virtual coupons or promotions. Alternately, other visual effects may be used including star ratings, numeric ratings, and animations.

Additionally, 3-D shopping rendering computer system 130 create and provide virtual shopping experience 140 using non-product content including points-of-sale, signage, and other branding. For example, certain products may be displayed using brand signage for the manufacturer or retailer of the products. In such examples, the details related to the points-of-sale, signage, and other branding may be provided in, variously, product lists, presentation rules, and online retailer data. As with products, the non-product content may include information related to presentation including virtual dimensions, colors, animations, and interactivity.

Further, in some examples, 3-D shopping rendering computer system 130 may allow an online user to save a virtual shelf, virtual aisle, or virtual store for later usage. For example, an online user may particularly wish to repeat the same virtual shopping experience 140 currently engaged in and may "save" virtual shopping experience 140. In some cases, the online user may save virtual shopping experience 140 and include the user status in the saved virtual shopping experience 140 so that the location of the online user may be resumed from their location at the time of saving. In other examples, 3-D shopping rendering computer system 130 may allow an online user to alter or adjust virtual shopping experience 140 by deleting, altering, or adding virtual shelves, and/or virtual aisles. Additionally, online users may share virtual shelves, virtual sections, and virtual stores with friends, contacts, or the public via social networks. In some examples, 3-D shopping rendering computer system 130 may include an internal social network and online users may similarly share virtual shelves, virtual sections, and virtual stores with friends, contacts, or the public via the internal social networks.

In additional examples, 3-D shopping rendering computer system 130 may allow an online user to filter a shelf based on selection criteria. For example, a user may filter shelves that are displayed (e.g., in "shelf view" described below) based on any suitable category including product size, product volume, product brand, price, and quantity. Accordingly, in one example, an online user viewing a shelf may only wish to view products on the shelf that are discounted. When the online user specifies this selection criteria via a user interface filter (presented by 3-D shopping rendering computer system 130 in virtual shopping experience 140), products that are not discounted may be made invisible, greyed out, replaced by other products, or otherwise altered in display. Similarly, the online user may specify different filtering categories or combinations of filtering categories.

Figure 2:
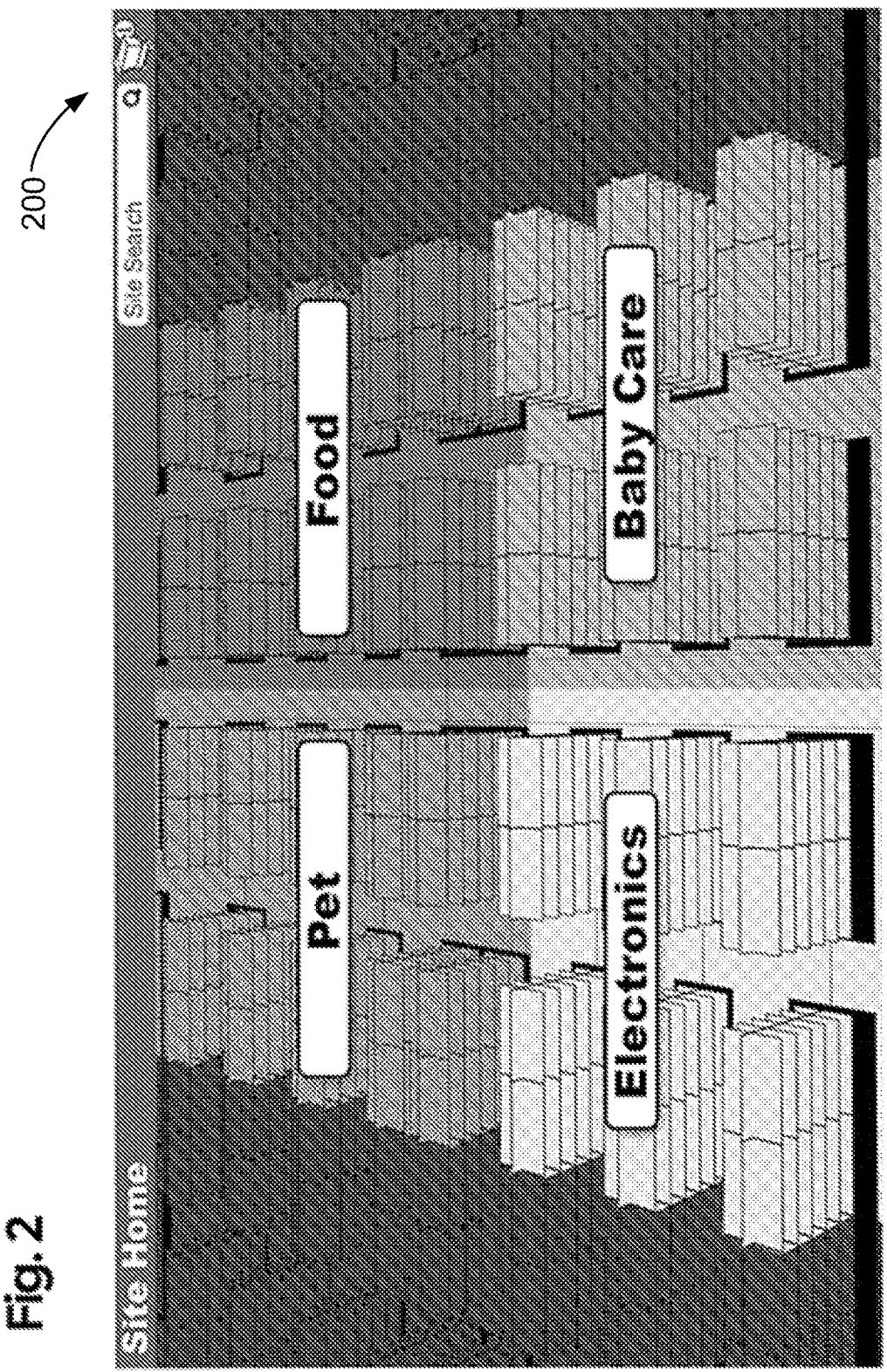
FIG. 2 is a first overhead view of an example 3-D shopping experience provided to an online shopping computer system using the 3-D shopping rendering computer system described herein.

FIG. 2 is a first overhead view 200 of an example 3-D shopping experience provided to an online shopping computer system using 3-D shopping rendering computer system 130 (shown in FIG. 1). First overhead view 200 may also be referred to as "store view". The store view appears as an overhead map of a physical store (or a real-world store). Instead of attempting to accurately display all of the various products an on-line retailer sells, the store view will feature various departments arranged like a physical store. These departments can be arranged by department, specific product types, or any logical grouping or search result. Accordingly, such configurations of the departments or regions may correspond to the product groupings described herein. In some examples, product grouping may include online data such as groupings of products based on social media rankings. Such online data may be accessed by 3-D shopping rendering computer system 130 using any suitable method.

Figure 3:
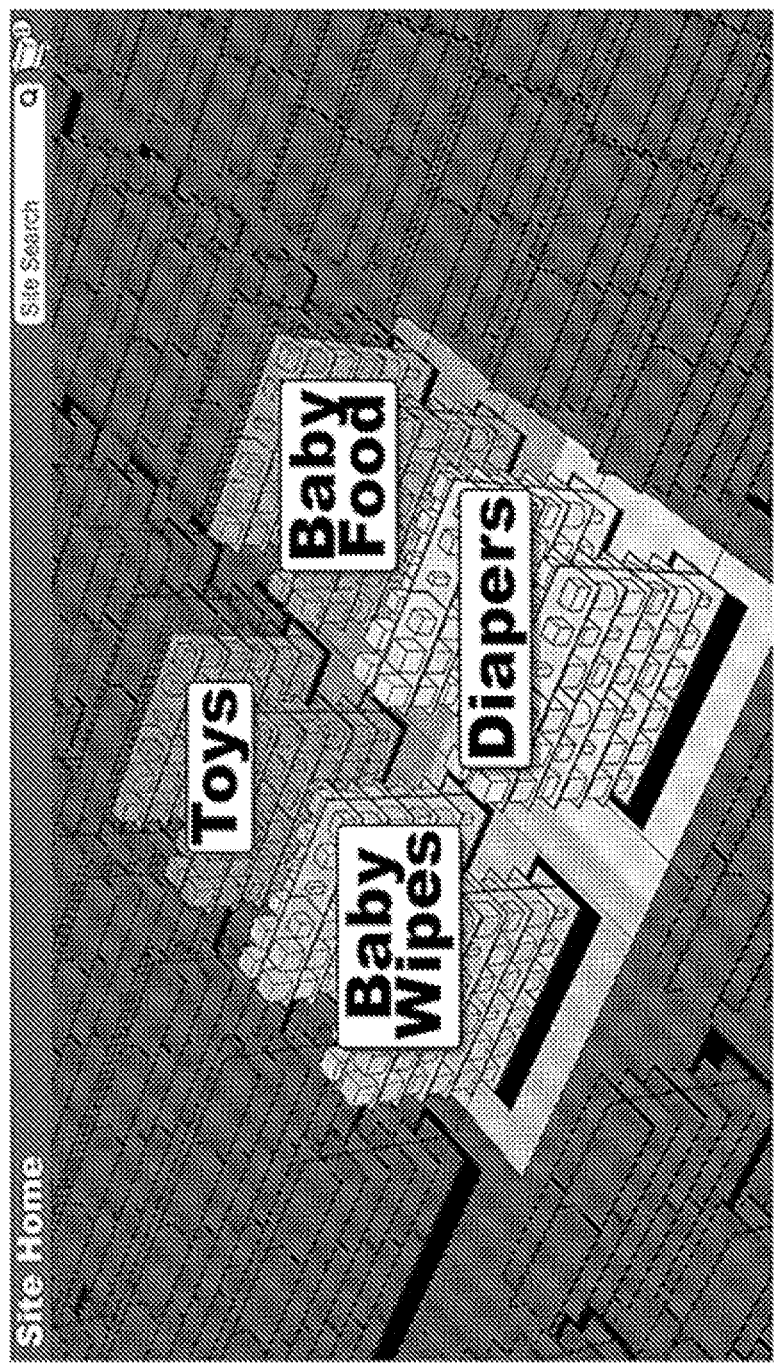
FIG. 3 is a second overhead view representing a drill-down view of a top level view of the example 3-D shopping experience shown in FIG. 2 and provided to an online shopping computer system using the 3-D shopping rendering computer system described herein.

FIG. 3 is a second overhead view 300 of the example 3-D shopping experience shown in FIG. 2 and provided to an online shopping computer system using 3-D shopping rendering computer system 130 (shown in FIG. 1). Second overhead view 300 may also be referred to as "department view". In overhead view 300, or department view, an online user may select a shelf they would like to view. The shelves are similar to real-world shelves and feature a various different products are related to each other. For example, if the customer selected the "Baby Care" department within department view (first overhead view 200), the online user may choose to view the "Diapers" shelf in department view.

Figure 4:
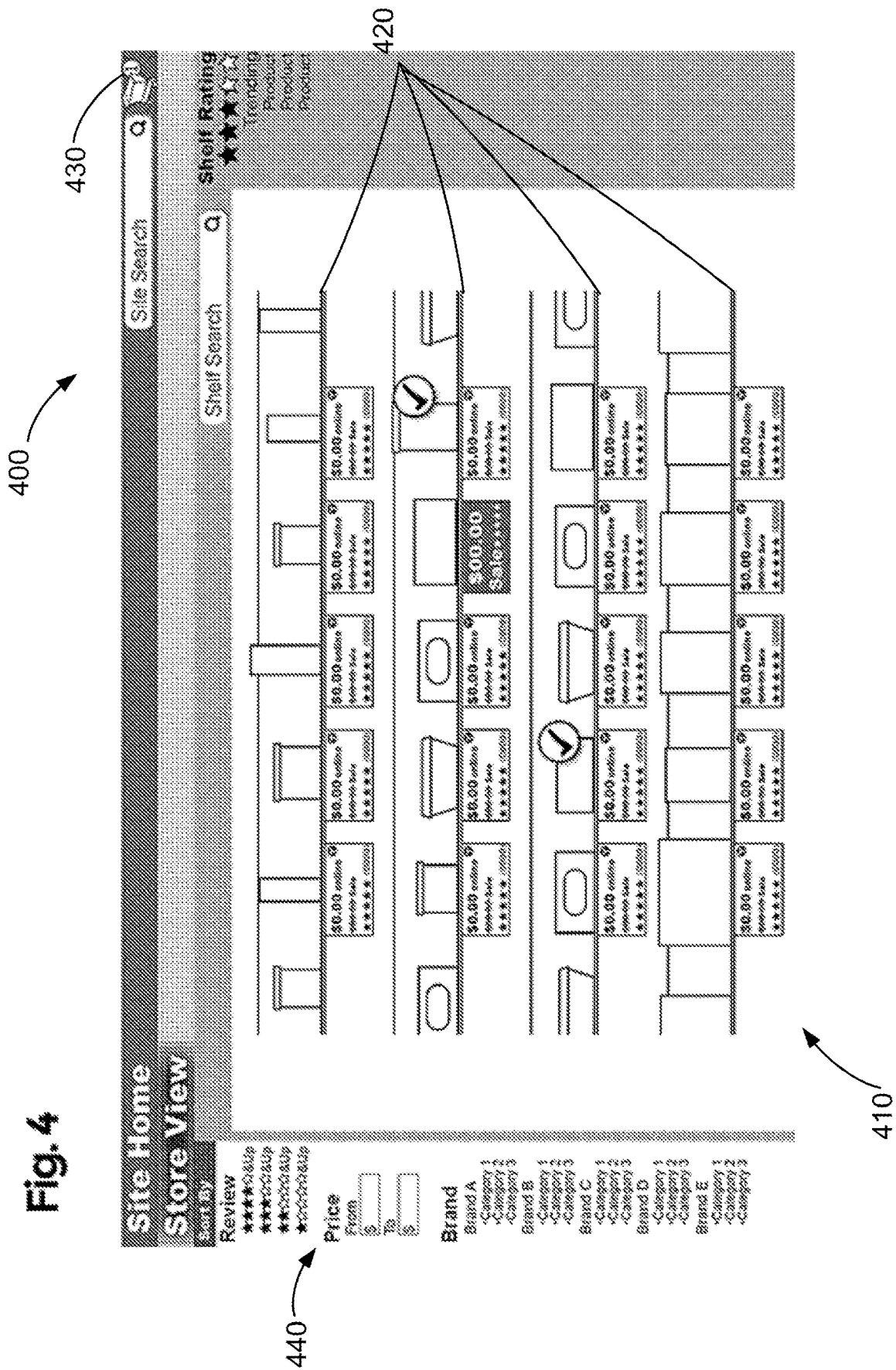
FIG. 4 is a first view of a first virtual shopping aisle included within the 3-D shopping experience shown in FIGS. 2 and 3 and provided to an online shopping computer system using the 3-D shopping rendering computer system described herein.

FIG. 4 is a first view 400 of a first virtual shopping aisle included within the 3-D shopping experience shown in FIGS. 2 and 3 and provided to an online shopping computer system using 3-D shopping rendering computer system 130 (shown in FIG. 1). First view 400 may also be referred to as "shelf view".

Within the shelf view, online users may see a variety of products 410 that are related to their searched term or previous selection as defined in product request 120 (shown in FIG. 1). The products are displayed on a plurality of 3-D virtual shelves 420. If a 3-D product image for a product identifier does not exist in the 3-D shopping rendering computer system 130 (shown in FIG. 1), the 2-D image of the product may be accessed from online shopping computer system 110 (shown in FIG. 1) and modified using any suitable method so that the modified 2-D product so it blends in with the 3-D products.

Online users may navigate around the shelf to view any of the 3-D products 410 and add them into a retailer shopping cart 430 associated with the online shopping computer system 110. Selling information 440 is also displayed such as price, user reviews, and descriptions. 3-D products 410 that have specialized display features (such as flex graphics) may have customized positions based on how the retailer wishes to display the products packaging. Such specialized features may be integrated at and/or supplied by a retailer or online retailer via any suitable computing device.

3-D shopping rendering computer system 130 may layout and render shelves 420 with 3-D products 410 arranged based on a variety of factors including product lists, change lists, presentation rules, online user data, and online retailer data. For example layout may be determined based on planograms received with product request 120, based on similar products as identified in online retailer data, based on previous purchases made by online user and included within online user data, based on social media data, based on seasonal and special events (e.g., expecting parents, college students, and new pet owners), based on gift registries (e.g., gift registries for registrants associated with online user and included in online user data), and based on wish-lists (e.g., wish lists for friends or contacts of online user and included within online user data). 3-D shopping rendering computer system 130 may layout and render clearance shelves that show discounted 3-D products 410 pre-selected by the online retailers (and included within online retailer data). 3-D shopping rendering computer system 130 may layout and render shelves 420 to display remaining product inventory to customers, alerting them when a product is in low supply (e.g., using empty space to show limited stock, providing a sign indicating the number of remaining items, or any other suitable method).

As described herein, when an online user selects a specific product in view 400 (or any other suitable view), the 3-D product may be displayed as a "pop-up" in an overlay window. The overlay window may allow the online user to rotate the 3-D product or package in 360 degrees, zoom in and out to read package details, view product information, view product ratings, view pricing information, view color information, and view quantity information. Further, from such an overlay view, the online use may select the product to be added to retailer shopping cart 430. The online user may also go to a product page at the online retailer to receive more information related to the product.

Further, an online user may select multiple products within virtual shopping experience 140 in order to compare products. For example, an online user may seek to compare two different types of cell phones based on aesthetics (e.g., shape, design, and color). Accordingly, an online user may select two cell phones presented in shelf view 400 and both products may "pop-up" in side-by-side overlays. As a result, both products may be simultaneously compared and reviewed while manipulating or rotating the 3-D product images. As described above, in such a "pop-up" view, text, enhanced data, and enhanced content from manufacturers or retailers of each product may be provided. In at least some examples, online users may compare more than two products in a side-by-side manner. As described, an online user may select any number of comparable products for simultaneous comparison. In some examples, 3-D shopping rendering computer system 130 may highlight known distinctions between products in such comparisons. For example, similar food products may be compared and distinctions in nutritional quality may be highlighted or made available. Such distinctions may be determined by 3-D shopping rendering computer system 130 or received by 3-D shopping rendering computer system 130 from other systems including online shopping computer system 110.

Figure 5:
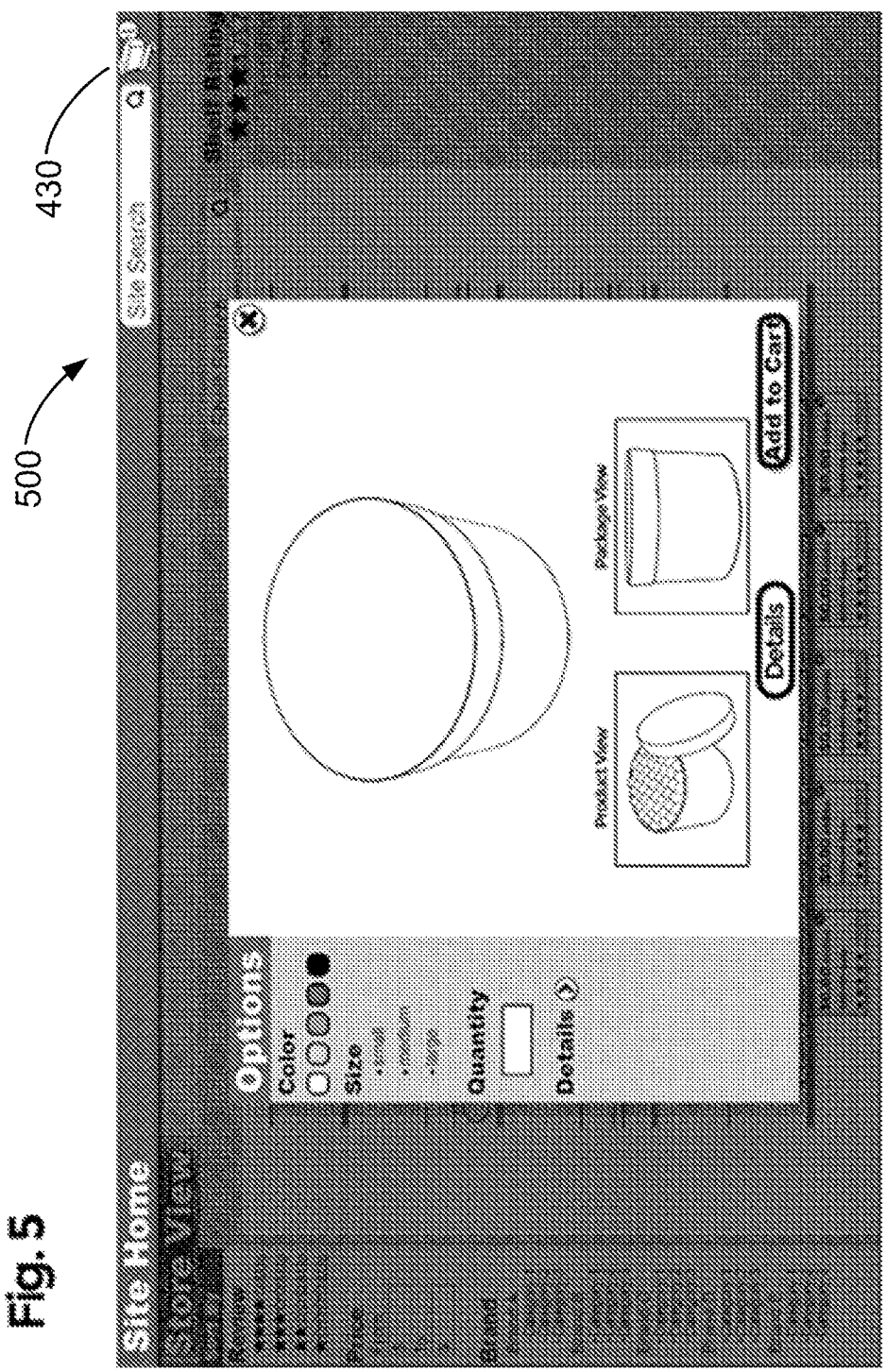
FIG. 5 is a view of a 3-D illustration of a product selected from the virtual shopping aisle of FIG. 4 within the 3-D shopping experience shown in FIGS. 2 and 3 and provided to an online shopping computer system using the 3-D shopping rendering computer system described herein.

FIG. 5 is a view of a 3-D illustration 500 of a product selected from the virtual shopping aisle of FIG. 4 within the 3-D shopping experience shown in FIGS. 2 and 3 and provided to an online shopping computer system using 3-D shopping rendering computer system 130 (shown in FIG. 1). 3-D illustration 500 may also be referred to as "product view". Online user may select a specific product from the shelf view (first view 400) and a 3-D illustration for a particular 3-D product 410 (shown in FIG. 4) may be displayed. In the example embodiment, the online user may use the display to rotate the selected product, zoom in and out for detail on the selected product and packaging, view product information, view rating details and reviews, view price information, view product options (e.g., color), view remaining quantity left, and view quantities included. The online user may select the product for purchase or inclusion within retailer shopping cart 430. The online user may also go to the product description page (not shown) to learn even more about the item, and return to 3-D illustration 500.

Each of views 200, 300, 400, and 500 are designed to be modular and may be used separately or as desired by online shopping computer system 110 (shown in FIG. 1). The invention does not rely on any particular view mode to access and display the products from 3-D shopping rendering computer system 130 (shown in FIG. 3). Accordingly, such views 200, 300, 400, and 500 are illustrative and not limiting.

Each view 200, 300, 400, and 500 is also designed in a way that allows online users a way to easily navigate between the product displays of the invention to standard website associated with online shopping computer system 110. The virtual shopping experience may easily be embedded into the online retailer's site by allowing them to customize the experience. For example, the online retailer may use their own branding assets to customize their virtual store.

Online users may interact with the virtual shopping experience in a variety of ways. Depending upon their user computing device, the online user may use any suitable input to navigate along shelves, store departments, to retrieve products, to view products, to rotate products, to zoom in and out on features, and to otherwise engage with the virtual shopping experience. In at least some examples, online users may interact with the virtual shopping experience using wearable technology such as optical head-mounted displays (OHMDs). In such examples, any suitable physical gesture, verbal command, or other interaction may be used to interact with the virtual shopping experience.

Because the virtual shopping experience is meant to emulate the experience of shopping in a physical store, the display characteristics may be relevant and customized to a user. The virtual altitude of the display (e.g., eye-level) may be customized by the customer/shopper so it can mirror their actual height. Alternately, the virtual altitude may lock-in with each product, or some other height that the customer request.

When viewing products on the shelf, online users may substantially make a new request of 3-D shopping rendering computer system 130 to change what is displayed by changing their selection criteria to include or exclude different options. Accordingly, 3-D shopping rendering computer system 130 may receive a display request from the online user and generate a virtual shopping layout that is rendered into a virtual shopping experience based on such a change in selection criteria. The online users may also rate individual shelves and provide information that may be used in future rendering of virtual shopping experiences. For example, low rated shelves may not be presented to a particular online user who rated that such shelves poorly.

In some examples, specific products may be displayed to the online user in a Crystal Ball/My Intent area (not shown) specifically targeted to the online user based on previous purchases (as specified in online user data). Accordingly, any suitable method of data analytics may be used to provide products in the Crystal Ball/My Intent area. Similarly, such online user data may be used to create a shelf that is completely comprised of items the online user may be interested in purchasing.

In other examples, retailer reward and loyalty cards may also be integrated into the virtual shopping experience. For example, online users may earn promotions in a similar way they would in a brick-and-mortar store, along with earning rewards in ways that can only happen in a virtual store. For example, games or tasks may be included in the virtual shopping experience so that online users may accrue loyalty points based on looking at items, finding hidden icons, and sharing information or behaviors on social media.

Figure 6:
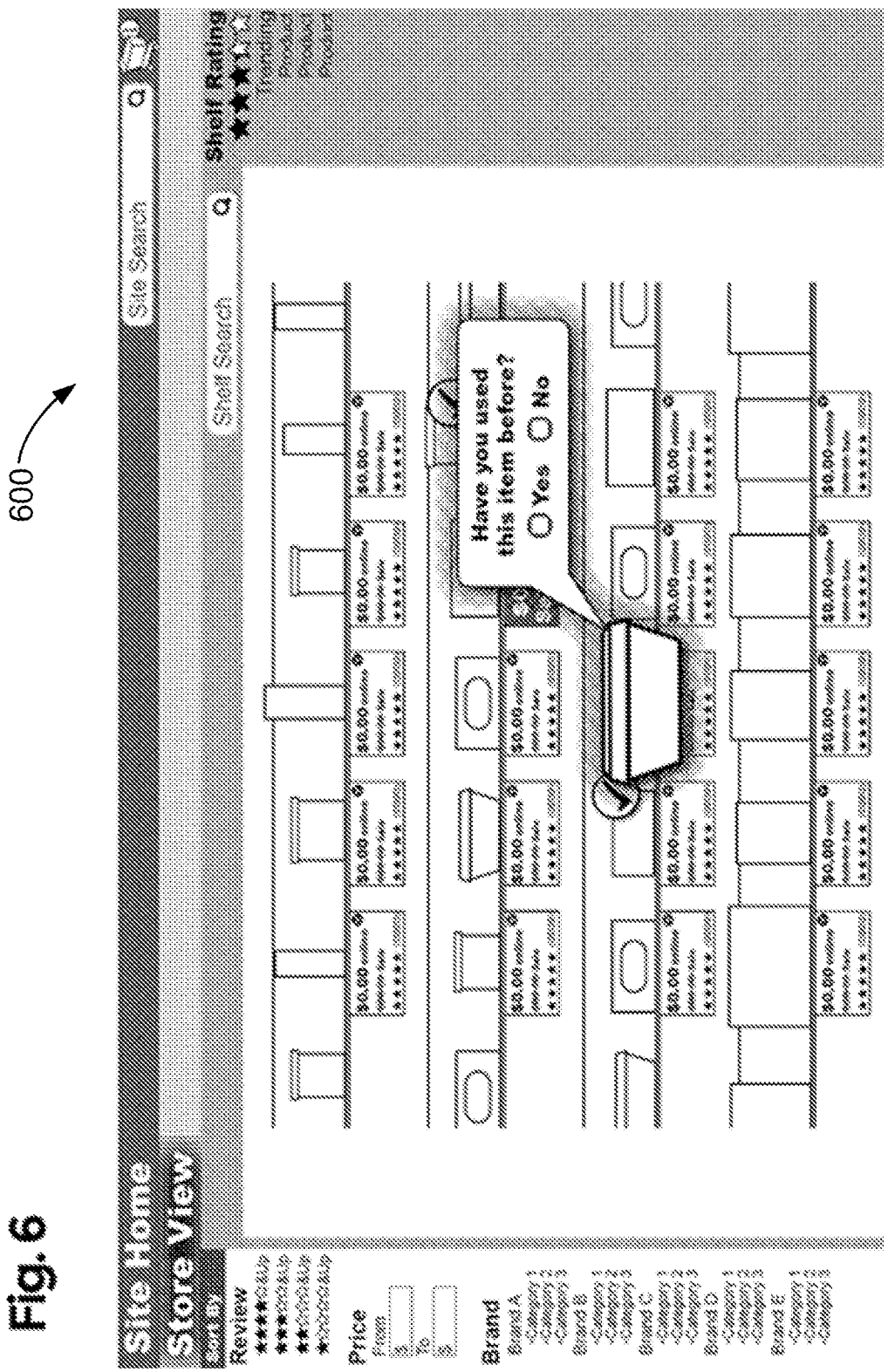
FIG. 6 is a second view of the first virtual shopping aisle of FIG. 4 further illustrating data collection and research features provided to an online shopping computer system using the 3-D shopping rendering computer system described herein.

FIG. 6 is a second view 600 of the first virtual shopping aisle of FIG. 4 further illustrating data collection and research features provided to an online shopping computer system using 3-D shopping rendering computer system 130 (shown in FIG. 1). More specifically, second view 600 illustrates data collection capabilities of the virtual shopping experience.

Such data collection features may be used to create analytics for online shopping computer system 110 and improve the quality of the virtual shopping experience and also improve the quality of online shopping experiences with traditional online retailers (e.g., using online shopping computer system 110) and traditional off-line (i.e., physical store) shopping experiences. As an online user interacts with the virtual shopping experience, information may be collected which may be accessed by the retailer (via the online shopping computer system 110), product producers, software developers, and any other suitable parties.

In at least some examples, 3-D shopping rendering computer system 130 (shown in FIG. 1) is configured to track several behaviors of the online user. Such behaviors may include a) the total time the online user spends viewing a particular category, b) the time it takes an online user to first interact with a particular product, c) a listing of products interacted with by the online user, d) a total amount of time spent by the online user with each individual product in each view or behavior, e) a total count of products that the online user interacts with, f) information related to side-by-side comparisons made by the online user with multiple products, g) a listing of products added to the shopping cart of the online user, h) a total amount of time spent by the online user at each shelf, i) a listing of products that are compared by the online user, j) a listing of products searched for by the online user that are not found, k) information related to interaction by the online user with each promotional display, l) a listing of registry and wish list items viewed, compared, and purchased by the online user, m) where available, information related to the navigation of the online user within the virtual shopping experience including mouse movement and eye or head movement (e.g., as detected by OHMDs), n) information related to the use of help services by the online user, o) information related to the path made by the online user in navigating the virtual shopping experience, p) a listing of the average size of packages viewed, evaluated, and purchased by the online user, q) a listing of the shelf location of products purchased by the online user, r) a count of customers that do not purchase any products in the virtual shopping experience, s) a count of unique visitors to the virtual shopping experience, t) a count of new users of the virtual shopping experience on a periodic basis, u) a count of returning users to the virtual shopping experience on a periodic basis, v) information related to the user computing device or user computing devices used by the online user, and w) any other suitable online user behavior.

Figure 7:
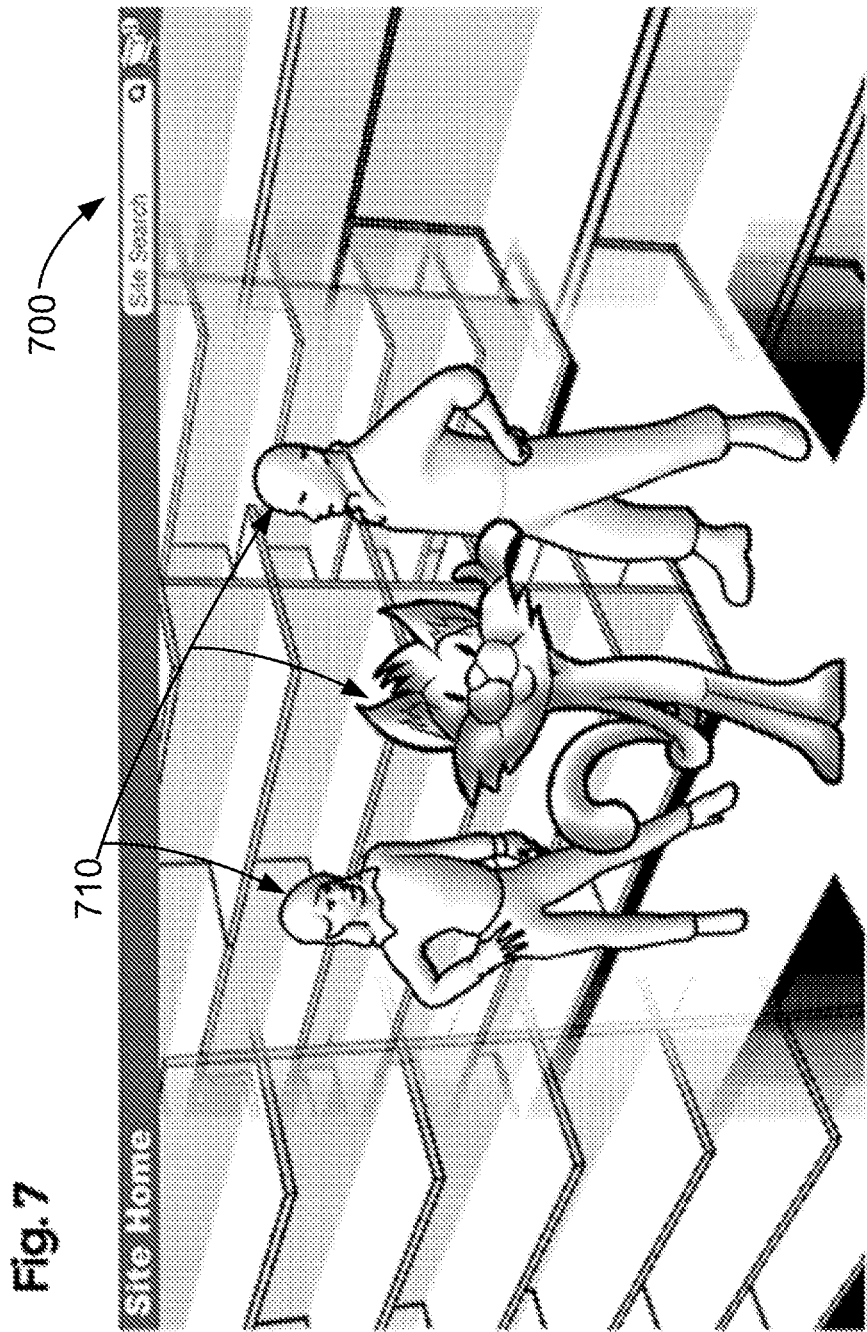
FIG. 7 is an illustration of a plurality of example avatars that may be used by online users navigating the 3-D shopping experience provided to an online shopping computer system using the 3-D shopping rendering computer system described herein.

FIG. 7 is an illustration 700 of a plurality of example avatars 710 that may be used by online users navigating the 3-D shopping experience provided to an online shopping computer system using 3-D shopping rendering computer system 130 (shown in FIG. 1). Online users may create or use virtual avatars 710 to represent themselves while browsing the virtual shopping experience (e.g., along shelves 420). Avatars 710 may be viewed by other online users shopping at the same time in order to allow for online users to share and shop together.

Help and guidance in the form or tutorial, help buttons, and custom designed retailer avatars will be available to help customer with navigating and using this invention.

Figure 8:
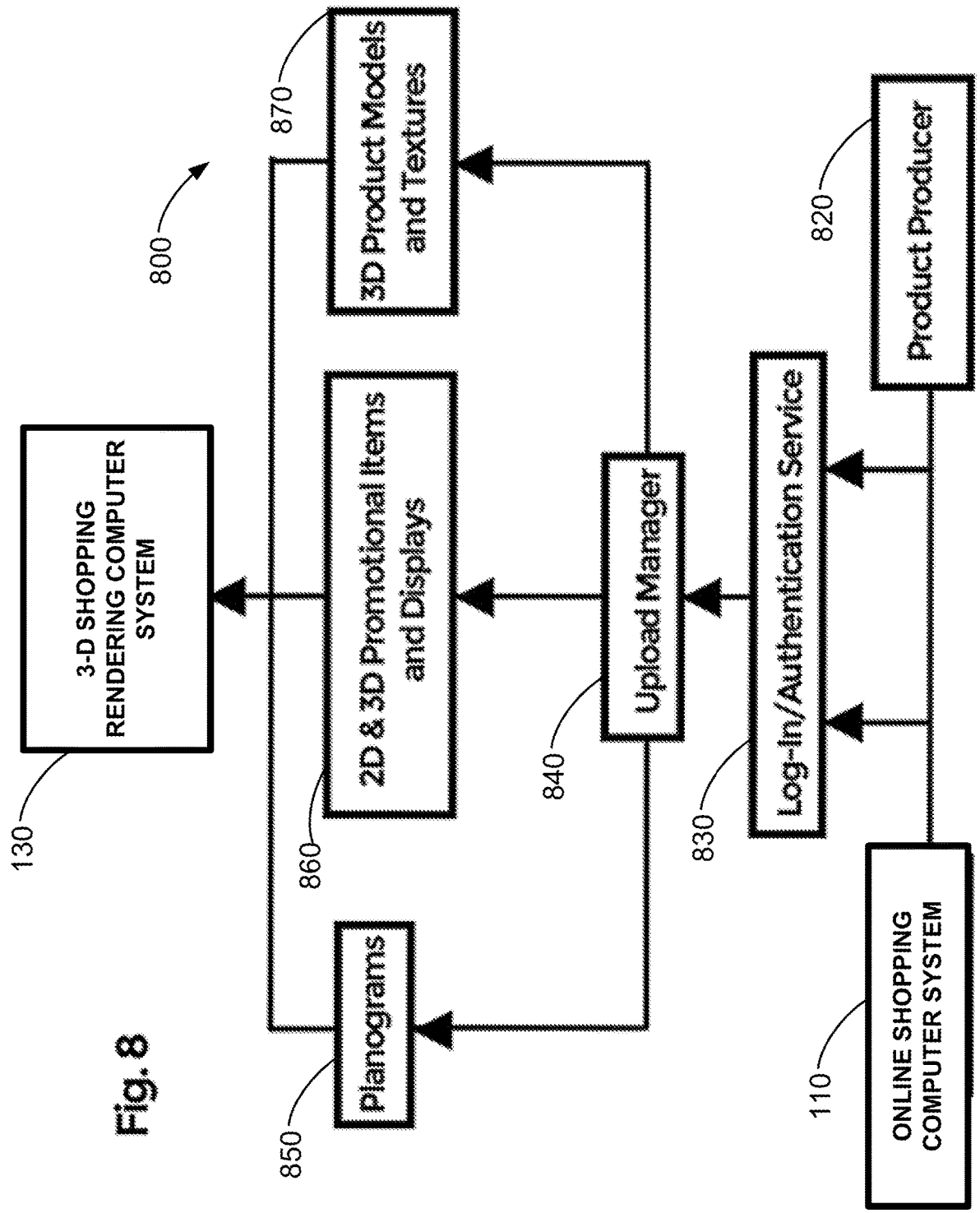
FIG. 8 is a simplified flow chart illustrating administrative and security tasks associated with managing the 3-D shopping rendering computer system described herein.

FIG. 8 is a simplified flow chart 800 illustrating administrative and security tasks associated with managing 3-D shopping rendering computer system 130 (shown in FIG. 1). Specifically, flow chart 800 illustrates the options available to content providers that provide, access, alter, and use products managed by 3-D shopping rendering computer system 130 including, for example, 3-D product images, product identifiers, and information related to such products.

In the example embodiment, external systems such as online shopping computer system 110 and product producer computer system 820 may access 3-D shopping rendering computer system 130 using log-in/authentication service 830. Systems 110 and 820 may further provide or access product information using upload manager 840 to provide, manage, alter, or remove product information including, for example, planograms 850, 2-D and 3-D promotional items and displays 860, and 3-D product models and textures 870. Accordingly, such information 850, 860, and 870 may be updated within 3-D shopping rendering computer system 130. Such product information may be manually updated (on an instance-by-instance basis) or alternately automated based on an integration between systems 110, 130, and/or 820.

Figure 9:
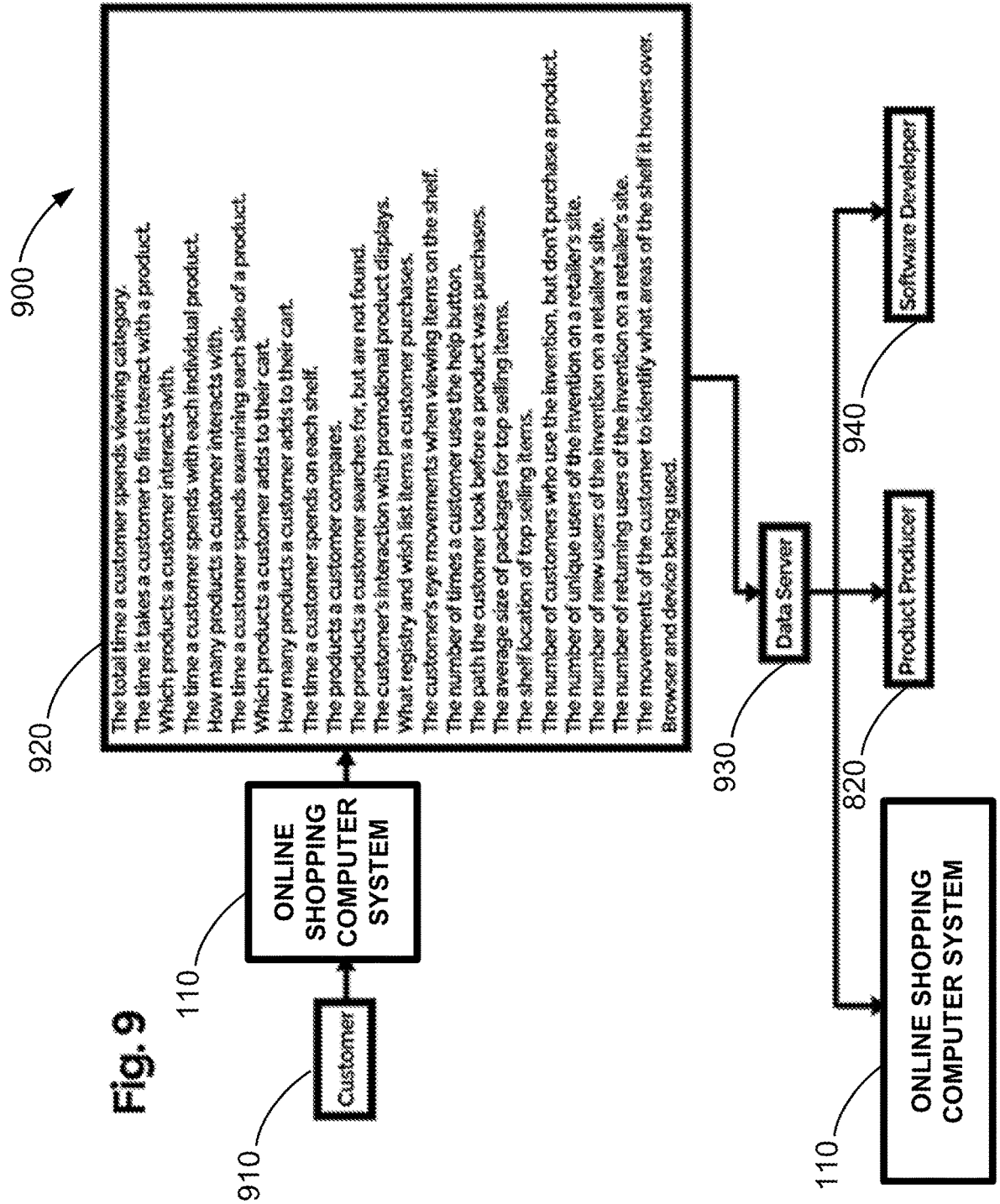
FIG. 9 is a simplified flow chart illustrating the collection of data and flow of data between the online shopping computer system and the 3-D shopping rendering computer system described herein.

FIG. 9 is a simplified flow chart 900 illustrating the flow of information between online shopping computer system 110 and 3-D shopping rendering computer system 130 (shown in FIG. 1). More specifically, flow chart 900 illustrates 3-D shopping rendering computer system 130 receiving interaction data 920 as described in FIG. 6 from online user 910 via online shopping computer system 110. Such interaction data 920 may be stored at a data server 930 and provided to consumers including online shopping computer system 110, product producer 820, and software developer 940.

Figure 10:
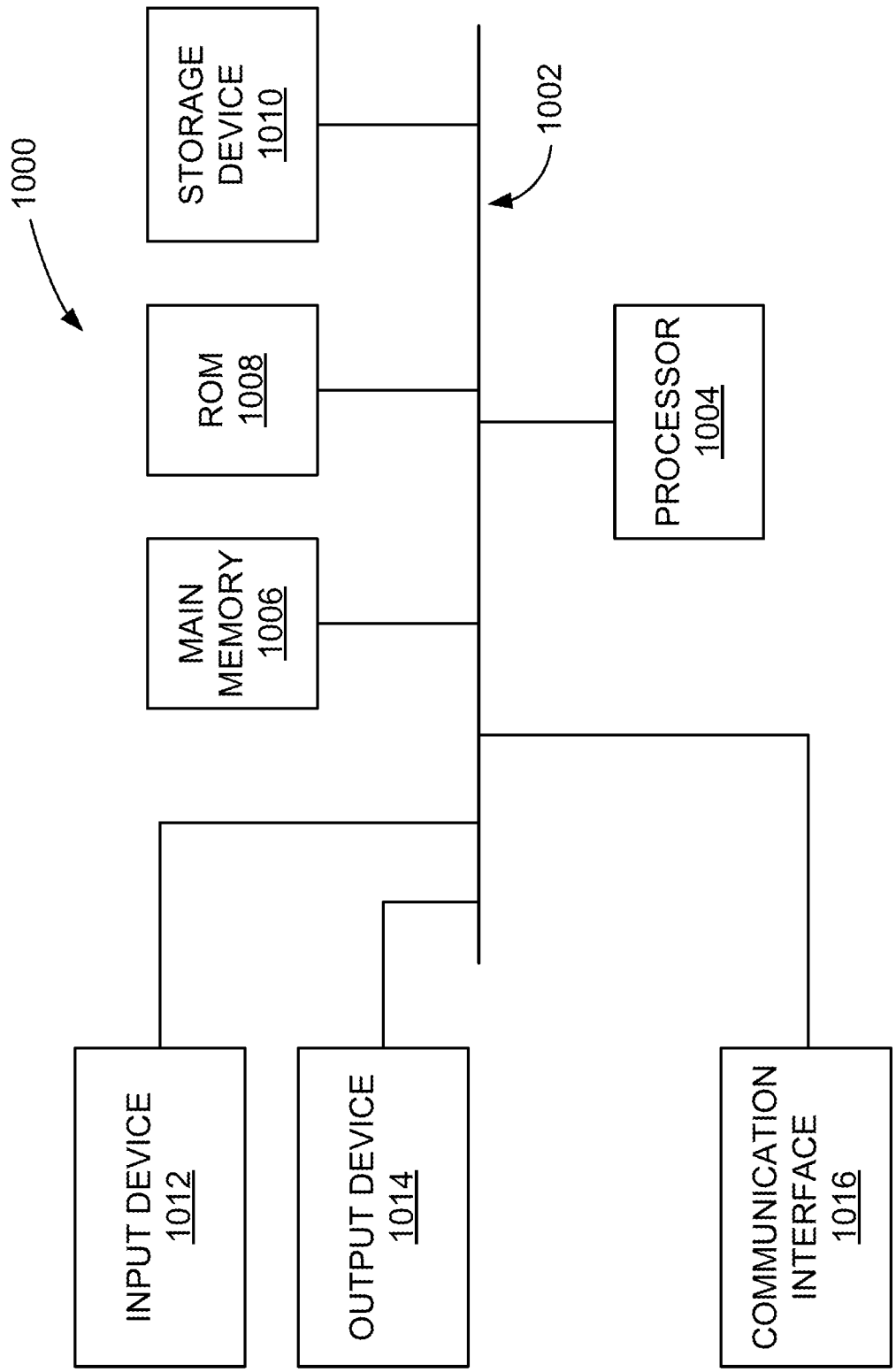
FIG. 10 is a block diagram of an example computing device that may be used for providing a 3-D shopping experience to an online shopping computer system.

FIG. 10 is a block diagram of an example computing device that may be used for providing a 3-D shopping experience to an online shopping computer system. FIG. 10 shows an example of a generic computing device 1000 intended to represent various forms of digital computers, such as laptops, desktops, workstations, personal digital assistants, servers, blade servers, mainframes, and other appropriate computers. Specifically, generic computing device 1000 may represent 3-D shopping rendering computer system 130 (shown in FIG. 1) and online shopping computer system 110 (shown in FIG. 1). Computing device 1000 is also intended to represent various forms of mobile devices, such as personal digital assistants, cellular telephones, smart phones, and other similar computing devices. Computing device 1000 may also describe embodiments of user computing devices such as wearable technology including OHMDs (wherein input device 1012, output device 1014, and communication interface 1016 are substantially adjusted for such a context. The components shown here, their connections and relationships, and their functions, are meant to be examples only, and are not meant to limit implementations of the subject matter described and/or claimed in this document.

In the example embodiment, computing device 1000 could be such devices including online shopping computer system 110, 3-D shopping rendering computer system 130, and user computing devices. Computing device 1000 may include a bus 1002, a processor 1004, a main memory 1006, a read only memory (ROM) 1008, a storage device 1010, an input device 1012, an output device 1014, and a communication interface 1016. Bus 1002 may include a path that permits communication among the components of computing device 1000.

Processor 1004 may include any type of conventional processor, microprocessor, or processing logic that interprets and executes instructions. Processor 1004 can process instructions for execution within the computing device 1000, including instructions stored in the memory 1006 or on the storage device 1010 to display graphical information for a GUI on an external input/output device, such as display 1014 coupled to a high speed interface. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

Main memory 1006 may include a random access memory (RAM) or another type of dynamic storage device that stores information and instructions for execution by processor 1004. ROM 1008 may include a conventional ROM device or another type of static storage device that stores static information and instructions for use by processor 1004. Main memory 1006 stores information within the computing device 1000. In one implementation, main memory 1006 is a volatile memory unit or units. In another implementation, main memory 1006 is a non-volatile memory unit or units. Main memory 1006 may also be another form of computer-readable medium, such as a magnetic or optical disk.

Storage device 1010 may include a magnetic and/or optical recording medium and its corresponding drive. The storage device 1010 is capable of providing mass storage for the computing device 1000. In one implementation, the storage device 1010 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as main memory 1006, ROM 1008, the storage device 1010, or memory on processor 1004.

The high speed controller manages bandwidth-intensive operations for the computing device 1000, while the low speed controller manages lower bandwidth-intensive operations. Such allocation of functions is for purposes of example only. In one implementation, the high-speed controller is coupled to main memory 1006, display 1014 (e.g., through a graphics processor or accelerator), and to high-speed expansion ports, which may accept various expansion cards (not shown). In the implementation, low-speed controller is coupled to storage device 1010 and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Input device 1012 may include a conventional mechanism that permits computing device 1000 to receive commands, instructions, or other inputs from a user, including visual, audio, touch, button presses, stylus taps, etc. Additionally, input device may receive location information. Accordingly, input device 1012 may include, for example, a camera, a microphone, one or more buttons, a touch screen, and/or a GPS receiver. Output device 1014 may include a conventional mechanism that outputs information to the user, including a display (including a touch screen) and/or a speaker. Communication interface 1016 may include any transceiver-like mechanism that enables computing device 000 to communicate with other devices and/or systems. For example, communication interface 1016 may include mechanisms for communicating with another device or system via a network.

Computing device 1000 may perform functions such as those described herein in response to processor 1004 executing software instructions contained in a computer-readable medium, such as memory 1006. A computer-readable medium may be defined as a physical or logical memory device and/or carrier wave. The software instructions may be read into memory 1006 from another computer-readable medium, such as data storage device 1010, or from another device via communication interface 1016. The software instructions contained in memory 1006 may cause processor 1004 to perform processes described herein. Alternatively, hardwired circuitry may be used in place of or in combination with software instructions to implement processes consistent with the subject matter herein. Thus, implementations consistent with the principles of the subject matter disclosed herein are not limited to any specific combination of hardware circuitry and software.

The computing device 1000 may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Each of such devices may contain one or more of computing device 1000, and an entire system may be made up of multiple computing devices 200 communicating with each other.

The processor 1004 can execute instructions within the computing device 1000, including instructions stored in the main memory 1006. The processor may be implemented as chips that include separate and multiple analog and digital processors. The processor may provide, for example, for coordination of the other components of the computing device 1000, such as control of user interfaces, applications run by computing device 1000, and wireless communication by computing device 1000.

Computing device 1000 includes a processor 1004, main memory 1006, ROM 1008, an input device 1012, an output device such as a display 1014, a communication interface 1016, among other components including, for example, a receiver and a transceiver. The device 1000 may also be provided with a storage device 1010, such as a microdrive or other device, to provide additional storage. Each of the components are interconnected using various buses, and several of the components may be mounted on a common motherboard or in other manners as appropriate.

Computing device 1000 may communicate wirelessly through communication interface 1016, which may include digital signal processing circuitry where necessary. Communication interface 1016 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, WiFi, or other such transceiver (not shown). In addition, a GPS (Global Positioning system) receiver module may provide additional navigation- and location-related wireless data to computing device 1000, which may be used as appropriate by applications running on computing device 1000.

Figure 11:
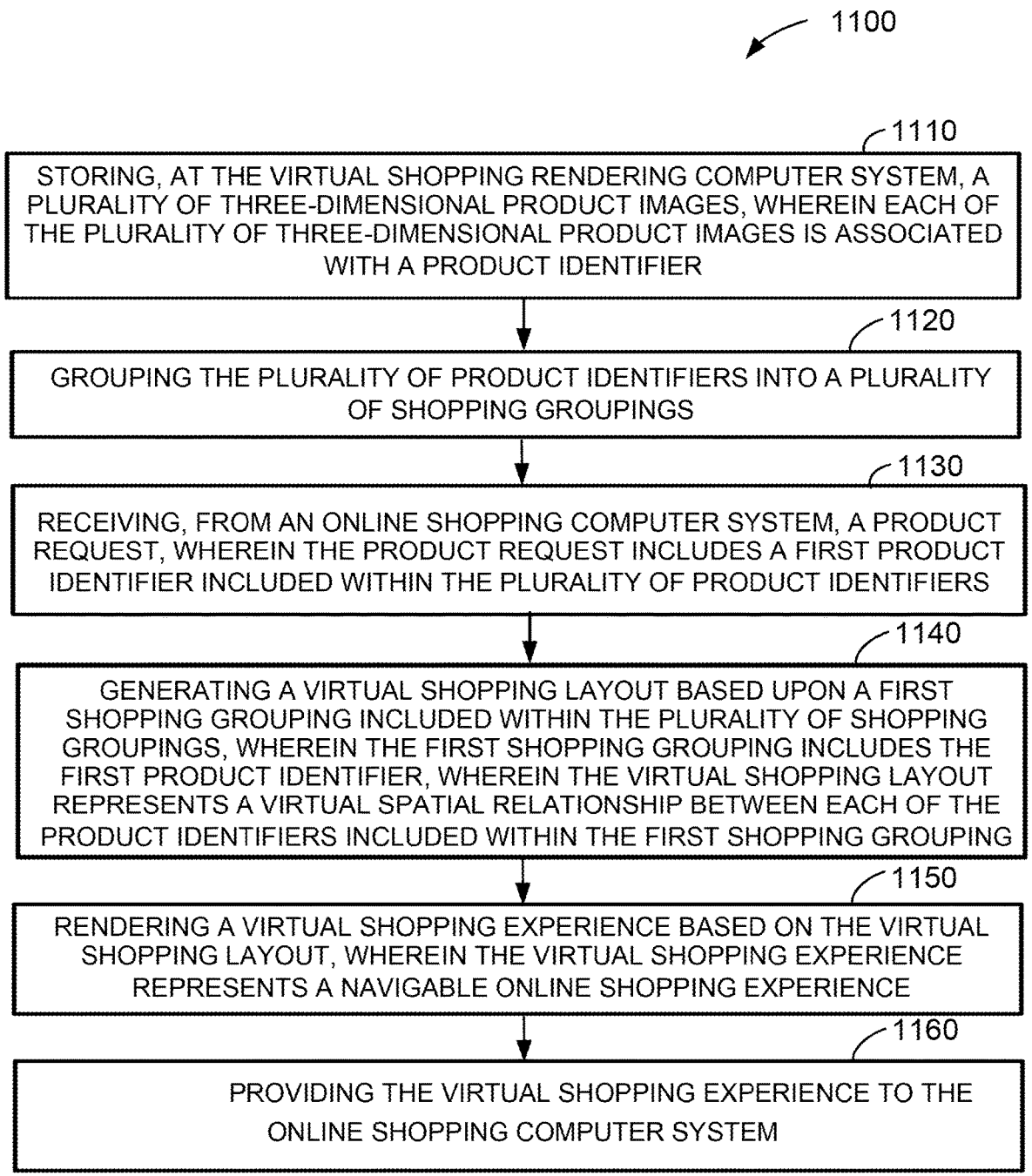
FIG. 11 is a simplified process of providing a 3-D shopping experience to an online shopping computer system implemented by a 3-D shopping rendering computer system.

FIG. 11 is a simplified process of providing a 3-D shopping experience to an online shopping computer system implemented by 3-D shopping rendering computer system 1130 (shown in FIG. 1).

3-D shopping rendering computer system 130 is configured to store 1110 a plurality of three-dimensional product images, wherein each of the plurality of three-dimensional product images is associated with a product identifier.

3-D shopping rendering computer system 130 is also configured to group 1120 the plurality of product identifiers into a plurality of shopping groupings.

3-D shopping rendering computer system 130 is further configured to receive 1130 a product request, wherein the product request includes a first product identifier included within the plurality of product identifiers. Alternately, as described above, the product request may represent a category request (for a category of products), a product promotional type request (e.g., on-sale products), a product-user relationship request (e.g., for products on a wish list), or any other any suitable logical grouping of products.

3-D shopping rendering computer system 130 is additionally configured to generate 1140 a virtual shopping layout based upon a first shopping grouping included within the plurality of shopping groupings, wherein the first shopping grouping includes the first product identifier, wherein the virtual shopping layout represents a virtual spatial relationship between each of the product identifiers included within the first shopping grouping.

3-D shopping rendering computer system 130 is also configured to render 1150 a virtual shopping experience based on the virtual shopping layout, wherein the virtual shopping experience represents a navigable online shopping experience.

3-D shopping rendering computer system 130 is further configured to provide 1160 the virtual shopping experience to the online shopping computer system.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the subject matter described herein or its features may have different names, formats, or protocols. Further, the system may be implemented via a combination of hardware and software, as described, or entirely in hardware elements. Also, the particular division of functionality between the various system components described herein is merely for the purposes of example only, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

While the disclosure has been described in terms of various specific embodiments, it will be recognized that the disclosure can be practiced with modification within the spirit and scope of the claims.

What is claimed is:

1. A computer-implemented method for providing a 3-D shopping experience to an online shopping environment using a 3-D shopping rendering computer system in communication with a memory, the method comprising:
storing, within the memory, a plurality of 3-D product images, wherein each of the plurality of 3-D product images is associated with a product and a product identifier;
grouping a plurality of product identifiers associated with the plurality of 3-D product images into a plurality of shopping groupings, wherein groupings of product identifiers are grouped based on groupings of the products within a particular region of a physical store;
receiving, from an online shopping computer system associated with a customer, a customer-based product request, wherein the customer-based product request includes a first product identifier included within the plurality of product identifiers;
filtering the plurality of 3-D product images to only include those products that may be purchased in a virtual shopping experience;
receiving, from the online shopping computer system, a plurality of online user information associated with the customer including a height of the customer, search histories of the customer, purchase histories of the customer, and purchase histories of social network contacts of the customer, wherein the customer is associated with the online shopping computer system that originated the customer-based product request;
generating, by the 3-D shopping rendering computer system, a virtual shopping layout based upon the plurality of online user information, the height of the customer, and a first shopping grouping included within the plurality of shopping groupings and the filtered plurality of 3-D product images, wherein the first shopping grouping includes the first product identifier, wherein the virtual shopping layout represents a virtual spatial relationship between each product identifier included within the first shopping grouping, and wherein an altitude of one or more products in the virtual shopping layout is based on the height of the customer;
rendering the virtual shopping experience based on the virtual shopping layout, wherein the virtual shopping experience represents a navigable online shopping experience; and
providing the virtual shopping experience to the online shopping computer system, wherein the virtual shopping experience includes allowing the customer to purchase one or more products rendered by the virtual shopping experience.

2. The method of claim 1, further comprising:
receiving the customer-based product request using an application programming interface; and
providing the virtual shopping experience by communication between the application programming interface and the 3-D shopping rendering computer system.

3. The method of claim 1, wherein generating the virtual shopping layout further comprises:
generating a plurality of virtual shopping aisles wherein a first virtual shopping aisle of the plurality of virtual shopping aisles includes the first product identifier; and
organizing the plurality of virtual shopping aisles to allow for an online user to navigate between the plurality of virtual shopping aisles.

4. The method of claim 1, further comprising:
receiving, from the online shopping computer system, a plurality of online retailer information associated with the customer-based product request, wherein the plurality of online retailer information includes behavior of previous customers including products that were purchased, products that were retrieved but not purchased, and products that were viewed and not retrieved; and
generating the virtual shopping layout based upon the plurality of online retailer information.

5. The method of claim 1, further comprising:
receiving a plurality of online user interaction data from the online shopping computer system based on interaction with the online shopping computer system associated with the customer, wherein the plurality of online user interaction data includes products that the customer purchased, products that were retrieved but not purchased by the customer, and products that were viewed and not retrieved by the customer;
processing the plurality of online user interaction data to determine a plurality of user metrics associated with the customer;
generating a plurality of analytical reports based upon the plurality of online user interaction data; and
providing the plurality of analytical reports to at least one of the online shopping computer system, a retailer computer system, and a product producer computer system.

6. The method of claim 1, further comprising:
receiving a plurality of user setting information; and
filtering the plurality of 3-D product images in the virtual shopping experience based on the plurality of user setting information.

7. The method of claim 1, further comprising:
receiving a plurality of product rules associated with at least one of a retailer and a first product, wherein the plurality of product rules define one or more presentation rules for displaying the first product; and
displaying the plurality of 3-D product images in the virtual shopping experience based on the plurality of product rules including the one or more presentation rules.

8. The method of claim 1, further comprising:
receiving product discount information; and
displaying the plurality of 3-D product images in the virtual shopping experience based on the product discount information, wherein only discounted products are displayed.

9. The method of claim 1, wherein the plurality of online user information further includes search histories of social network contacts of the customer, and wherein the method further comprises generating the virtual shopping layout based upon the search histories of the customer, the purchase histories of the customer, the search histories of social network contacts of the customer, and the purchase histories of social network contacts of the customer.

10. The method of claim 1, wherein the virtual shopping layout includes a plurality of shelves, and wherein the method further comprises:
receiving, from the customer via the online shopping computer system, a negative rating for a first shelf of the plurality of shelves; and
determining to exclude the first shelf during a subsequent virtual shopping experience based on the negative rating.

11. The method of claim 1 further comprising providing, via the virtual shopping experience, a game to the customer, wherein the customer interacts with the game via the virtual shopping experience.

12. A 3-D shopping rendering computer system for providing a 3-D shopping experience to an online shopping environment, the 3-D shopping rendering computer system comprising a memory for storing data, and a processor in communication with the memory, said processor programmed to:

store a plurality of 3-D product images at the memory, wherein each of the plurality of 3-D product images is associated with a product and a product identifier;

group a plurality of product identifiers associated with the plurality of 3-D product images into a plurality of shopping groupings, wherein groupings of product identifiers are grouped based groupings of the products within a particular region of a physical store;

receive, from an online shopping computer system associated with a customer, a customer-based product request, wherein the customer-based product request includes a first product identifier included within the plurality of product identifiers;

receive, from the online shopping computer system, a plurality of online user information associated with the customer including a height of the customer, search histories of the customer, purchase histories of the customer, and purchase histories of social network contacts of the customer, wherein the customer is associated with the online shopping computer system that originated the customer-based product request;

filter the plurality of 3-D product images to only include those products that may be purchased in a virtual shopping experience;

generate a virtual shopping layout based upon the plurality of online user information, the height of the customer, and a first shopping grouping included within the plurality of shopping groupings and the filtered plurality of 3-D product images, wherein the first shopping grouping includes the first product identifier, wherein the virtual shopping layout represents a virtual spatial relationship between each product identifier included within the first shopping grouping, and wherein an altitude of one or more products in the virtual shopping layout is based on the height of the customer;

render the virtual shopping experience based on the virtual shopping layout, wherein the virtual shopping experience represents a navigable online shopping experience; and provide the virtual shopping experience to the online shopping computer system, wherein the virtual shopping experience includes allowing the customer to purchase one or more products rendered by the virtual shopping experience.

13. The 3-D shopping rendering computer system of claim 12, wherein the processor is further programmed to:
receive the customer-based product request using an application programming interface; and
provide the virtual shopping experience by communication between the application programming interface and the 3-D shopping rendering computer system.

14. The 3-D shopping rendering computer system of claim 12, wherein the processor is further programmed to:
generate a plurality of virtual shopping aisles wherein a first virtual shopping aisle of the plurality of virtual shopping aisles includes the first product identifier; and
organize the plurality of virtual shopping aisles to allow for an online user to navigate between the plurality of virtual shopping aisles.

15. The 3-D shopping rendering computer system of claim 12, wherein the processor is further programmed to:
receive, from the online shopping computer system, a plurality of online retailer information associated with the customer-based product request, wherein the plurality of online retailer information includes behavior of previous customers including products that were purchased, products that were retrieved but not purchased, and products that were viewed and not retrieved; and
generate the virtual shopping layout based upon the plurality of online retailer information.

16. The 3-D shopping rendering computer system of claim 12, wherein the processor is further programmed to:
receive a plurality of online user interaction data from the online shopping computer system based on interaction with the online shopping computer system associated with the customer, wherein the plurality of online user interaction data includes products that the customer purchased, products that were retrieved but not purchased by the customer, and products that were viewed and not retrieved by the customer;
process the plurality of online user interaction data to determine a plurality of user metrics associated with the customer;
generate a plurality of analytical reports based upon the plurality of online user interaction data; and
provide the plurality of analytical reports to at least one of the online shopping computer system, a retailer computer system, and a product producer computer system.

17. The 3-D shopping rendering computer system of claim 12, wherein the processor is further programmed to:
receive a plurality of user setting information; and
filter the plurality of 3-D product images in the virtual shopping experience based on the plurality of user setting information.

18. A non-transitory computer-readable storage device, having processor-executable instructions embodied thereon, for providing a 3-D shopping experience to an online shopping environment, wherein when executed by a computer including at least one processor and a memory coupled to the processor, the processor-executable instructions cause the computer to:

store a plurality of 3-D product images, wherein each of the plurality of 3-D product images is associated with a product and a product identifier, wherein the product identifiers are grouped based on the groupings of the products within a particular region of a physical store;

group a plurality of product identifiers associated with the plurality of 3-D product images into a plurality of shopping groupings;

receive, from an online shopping computer system associated with a customer, a customer-based product request, wherein the customer-based product request includes a first product identifier included within the plurality of product identifiers;

receive, from the online shopping computer system, a plurality of online user information associated with the customer including a height of the customer, search histories of the customer, purchase histories of the customer, and purchase histories of social network contacts of the customer, wherein the customer is associated with the online shopping computer system that originated the customer-based product request;

filter the plurality of 3-D product images to only include those products that may be purchased in a virtual shopping experience;

generate a virtual shopping layout based upon the plurality of online user information, the height of the customer, and a first shopping grouping included within the plurality of shopping groupings and the filtered plurality of 3-D product images, wherein the first shopping grouping includes the first product identifier, wherein the virtual shopping layout represents a virtual spatial relationship between each product identifier included within the first shopping grouping, and wherein an altitude of one or more products in the virtual shopping layout is based on the height of the customer;

render the virtual shopping experience based on the virtual shopping layout, wherein the virtual shopping experience represents a navigable online shopping experience; and provide the virtual shopping experience to the online shopping computer system, wherein the virtual shopping experience includes allowing the customer to purchase one or more products rendered by the virtual shopping experience.

19. The non-transitory computer-readable storage device of claim 18, wherein the processor-executable instructions cause the computer to:

generate a plurality of virtual shopping aisles wherein a first virtual shopping aisle of the plurality of virtual shopping aisles includes the first product identifier; and organize the plurality of virtual shopping aisles to allow for an online user to navigate between the plurality of virtual shopping aisles.

* * * * *